(No Model.)
E. WINCHESTER.
APPARATUS FOR SEPARATING COCKLE AND SEEDS FROM WHEAT OR OTHER GRAIN.
No. 261,193. Patented July 18, 1882.
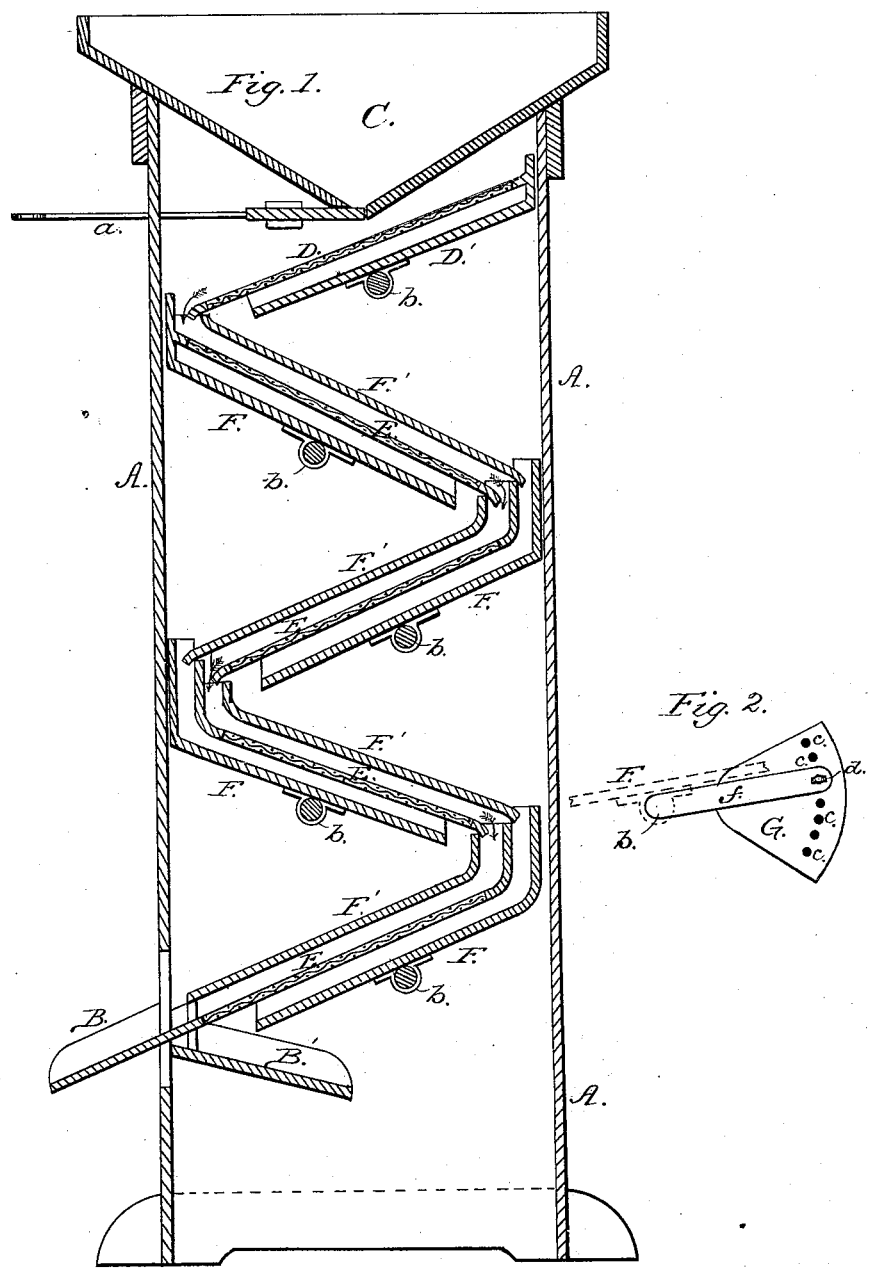
WITNESSES
Parker H. Sweet Jr.
J. E. Carpenter
INVENTOR
Ebenezer Winchester
By
J. B. Lawyer
ATTORNEY
N. PETERS, Photo-Lithographer, Washington, D. C.

United States Patent Office.

EBENEZER WINCHESTER, OF ROCHESTER, MINNESOTA, ASSIGNOR OF ONE-HALF TO STEWART B. CLARK, OF SAME PLACE.

APPARATUS FOR SEPARATING COCKLE AND SEEDS FROM WHEAT OR OTHER GRAIN.

SPECIFICATION forming part of Letters Patent No. 261,193, dated July 18, 1882.

Application filed April 11, 1882. (No model.)

*To all whom it may concern:*

Be it known that I, EBENEZER WINCHESTER, a citizen of the United States, residing at Rochester, in the county of Olmsted and State of Minnesota, have invented certain new and useful Improvements in Apparatus for Separating Cockle and Seeds from Wheat or other Grain; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide an improved apparatus of novel construction for separating cockle and seeds from wheat, oats, rye, or other seed or grain in the shortest and best possible manner; and it consists essentially of a stationary upright frame arranged beneath a grain-hopper and provided with a series of zigzag sieves and cockle-boards adapted to be adjustably secured within the said frame in such a manner as to regulate the pitch or incline of the said sieves and cockle-boards to suit the requirements of the grain to be treated, all as will be hereinafter more fully described, and specifically designated in the claim.

In the accompanying drawings, Figure 1 represents a vertical longitudinal section of my improved apparatus, and Fig. 2 is a detail view thereof.

Referring to the drawings, A represents the stationary upright frame, inclosed upon all sides, and provided with discharge-spouts B B' at the bottom and with the hopper C at the top portion thereof, as fully shown in Fig. 1. The mouth of the grain-hopper C extends a short distance down into the upper end of the upright frame A, where it is provided with a slide, *a*, or other suitable mechanism to regulate or control the supply of grain to the sieves. Directly below the mouth of the said hopper C is arranged a suitable grain-sieve, D, having a cockle or seed-board, D', directly below the same, said sieve and seed-board being connected together, as shown, and secured upon a central rod or axis, *b*, which is provided upon its outer end with an elbow or arm, *f*, which is capable of being moved up or down upon the plate G, and secured at any desired point thereon by means of the set-screw *d* in the outer end of said arm engaging with one of the holes *c* in the said plate G, as fully shown in Fig. 2, to give the sieve and seed-board a greater or less slant or pitch, according to the requirements of the grain to be treated. Beneath this grain-sieve and cockle-board is arranged in a zigzag manner a series of grain-sieves, E, which are provided with cockle-boards F F', one below and one above each sieve, as fully shown in Fig. 1. These grain-sieves and cockle-boards extend from one side of the upright frame A to the opposite side of the same, and are capable of being readily adjusted, as already described, to any pitch or angle to discharge the grain or cockle upon the next succeeding sieve or cockle-board, as the case may be.

In the operation of my invention the grain passes down through the mouth of the hopper C upon the inclined sieve D, and from thence down over the succeeding sieves E to the bottom of the apparatus, where the cleaned grain finds an exit at the spout B. During the passage of the grain over the sieves the cockle or other seeds fall through upon the cockle-boards beneath each sieve, from whence they are alternately carried along the cockle-boards above and below each sieve until discharged at the bottom through the spout B'. It will thus be seen that the grain is automatically screened and separated from the cockle or other foreign seeds without the aid of shaking-screens or other machinery, it simply being required to feed the grain into the hopper C, from where it readily passes down by gravity through the apparatus, over the screens or sieves, to the exit-spout B.

Having thus described my invention, what I claim as new and useful is—

The herein-described apparatus for screening and separating grain, consisting of the upright frame A, provided with the hopper C, discharge-openings B B', and the grain-sieves D E, cockle-boards D' F F', arranged in a zigzag manner from the top to the bottom of the apparatus, the arm *f*, having set-screw *d*, and the plate G, provided with the openings *c*, all substantially as and for the purpose specified.

In testimony whereof I affix my signature in presence of two witnesses.

EBENEZER WINCHESTER.

Witnesses:
H. A. ECKHOLDT,
C. X. WASHBURN.